United States Patent [19]

Mortimer

[11] 4,444,437
[45] Apr. 24, 1984

[54] DECELERATION-SENSING MODULATOR VALVE ASSEMBLY FOR VEHICLE BRAKING SYSTEMS

[75] Inventor: Ivan Mortimer, Solihull, England

[73] Assignee: Lucas Industries public limited company, Birmingham, England

[21] Appl. No.: 401,558

[22] Filed: Jul. 26, 1982

[30] Foreign Application Priority Data

Aug. 5, 1981 [GB] United Kingdom ............... 8123901

[51] Int. Cl.³ .......................... B60T 8/14; B60T 8/26
[52] U.S. Cl. .................................... 303/6 C; 188/349; 303/24 F; 303/24 C
[58] Field of Search ............... 303/24 A, 24 F, 24 C, 303/24 R, 6 C; 188/349, 151 A

[56] References Cited

U.S. PATENT DOCUMENTS

| | | | |
|---|---|---|---|
| 3,398,757 | 8/1968 | Milster | 303/24 C X |
| 3,489,465 | 1/1970 | Bueler | 303/24 C |
| 4,265,493 | 5/1981 | Ryuichi | 303/24 C |

FOREIGN PATENT DOCUMENTS 2042111 9/1980 United Kingdom .

Primary Examiner—Douglas C. Butler
Attorney, Agent, or Firm—Scrivener, Clarke, Scrivener and Johnson

[57] ABSTRACT

Valve assemblies for single and dual circuit braking systems are described. An assembly for a single circuit (FIG. 1) has a primary piston provided with a normally open valve seat engageable by a deceleration sensing ball housed in the primary piston. An annular secondary piston is slidably mounted on the larger diameter end of the primary piston. Primary piston has an area ($A_2$) exposed to outlet pressure in a chamber and a smaller area ($A_1$) exposed to inlet pressure in a housing bore portion, and is capable of rearward movement against biassing of a spring. Rearward movement of secondary piston is restricted firstly by a flange on the primary piston and secondly by a step on the housing. With increasing inlet pressure the pistons move rearwardly against the force of the spring until the seat is closed by rolling of the ball, and thereafter for increasing inlet pressure a stepped output characteristic is generated, the step in the characteristic resulting from the force required to remove the secondary piston from the housing step against outlet pressure.

6 Claims, 6 Drawing Figures

DECELERATION-SENSING MODULATOR VALVE ASSEMBLY FOR VEHICLE BRAKING SYSTEMS

SPECIFIC DESCRIPTION

This invention relates to a deceleration-sensing modulator valve assembly for vehicle braking systems of the kind comprising a housing provided with a brake pressure inlet and outlet, a control piston assembly working in the housing which controls the relationship between the inlet and outlet pressures and a deceleration sensing element located in the housing and adapted to close a valve seat for decelerations of the housing above a deceleration threshold, closure of the valve seat being arranged to influence the control exerted by the control piston assembly. Such a modulator assembly will hereinafter be referred to as 'a valve assembly of the kind set forth'.

The brake pressure inlet of such an assembly is connected in use to a brake pressure supply, which in a single circuit system is also connected to the front wheel brakes, and the brake pressure outlet is connected to the rear wheel brakes.

There have been many proposals for valve assemblies of this kind which are intended to provide a relationship between inlet and outlet pressures which approximates to the ideal curves appropriate to different loading conditions of the vehicle.

In G.B. Specification No. 2 042 111 is disclosed a proposed assembly in which a second annular piston is slidably mounted on a first, main control piston, housed in a first bore of the housing, and independent resilient biassing is provided for each of the pistons. The first piston is provided with a flange which limits the relative movement in one direction of the first and second pistons. The first piston controls a metering valve arranged between the housing inlet and outlet, and a deceleration sensing ball located in a second bore of the housing is engageable with a deceleration valve seat controlling fluid flow through a passage arranged in parallel with the metering valve. Whilst the assembly provides a pressure characteristic having two 'split points' it is relatively costly to produce since the housing is made in two halves to permit machining of the two housing bores and to facilitate assembly.

The present invention stems from attempts to produce a relatively compact assembly which can be manufactured at minimum cost yet which posseses pressure characteristics approximating to the theoretical ideal curves.

According to the invention in a valve assembly of the kind set forth the control piston assembly comprises a primary piston and an annular secondary piston slidably mounted on the primary piston, resilient means biasses the primary piston in a forward direction, rearward movement of the secondary piston relative to the primary piston is limited by a stop carried by the primary piston, rearward movement of the secondary piston relative to the housing is restricted by restraining means, the deceleration sensing element is located at least substantially in a bore provided in the primary piston, the valve seat is associated with the primary piston and controls fluid communication between the inlet and outlet, and the arrangement is such that prior to closure of the valve seat by the sensing element the net pressure effective area of the primary piston subject to inlet pressure is forwardly facing whereby inlet pressure urges the primary piston rearwardly against the biassing of the resilient means, and after closure of the valve seat the net pressure effective area of the primary piston subject to inlet pressure is rearwardly facing, a forwardly facing area of the primary piston then being exposed to outlet pressure, and the secondary piston is subject at all times on its front face to inlet/outlet pressure.

In computing the pressure effective area of the primary piston subject to inlet pressure prior to closure of the valve it is necessary to include the area subject to outlet pressure, to take account of the fact that outlet pressure then substantially equals inlet pressure.

The arrangement of the deceleration sensing element within the primary piston can enable a more compact assembly to be achieved. All of the moving components may be arranged in a single bore of the housing which can lead to reduced manufacturing costs.

In addition, the use of two separate valves is avoided. The co-operation between the deceleration sensing element and said valve seat may be arranged to provide a metering action when it is desired to employ a metering action.

We consider it desirable in valves of the kind set forth that the deceleration sensing element be in the flow path between inlet and outlet, in order that during rapid braking applications the sensing element is urged by flow forces onto its seat, and such an arrangement is enabled by housing the sensing element in the primary control piston rather than in a separate passage through which only a fraction of the fluid passes.

Although the restraining means may comprise further resilient means opposing rearward movement of the secondary piston relative to the housing, the restraining means preferably comprises an abutment on the housing which is engaged by the secondary piston.

In one preferred arrangement the primary piston has larger and smaller diameter front and rear ends respectively which are exposed respectively to outlet and inlet pressure chambers which communicate directly with outlet and inlet ports. Bearing in mind that the outlet pressure is equal to the inlet pressure prior to closure of the valve seat by the deceleration sensing element, it will be seen that the net pressure effective area of the primary piston exposed to inlet pressure prior to closure of the valve seat is equal to the difference in areas between the opposite ends of the piston and that the net pressure effective area exposed to inlet pressure faces forwardly.

In another preferred arrangement for use with a dual circuit braking system the housing is provided with a secondary inlet port in addition to the primary inlet port, and failure of the pressure at the secondary inlet port is arranged to disable the primary piston to prevent any proportioning of the brake pressure at the outlet relative to the pressure at the primary inlet, the primary inlet and the outlet being connected into one brake circuit, and the secondary inlet being connected into the other brake circuit.

Preferably, the rear end of the primary piston exposed to primary inlet pressure is made of equal or larger diameter than the front end exposed to outlet pressure, and an annular forwardly facing area of the primary piston is exposed to the pressure of the secondary inlet, the pressure effective area of the annular area being arranged to be greater than the difference in area between the ends of the primary piston.

Preferably the front face of the secondary piston is also exposed to the pressure of the secondary inlet.

When both circuits are operational master cylinder pressure from one circuit is applied to the primary inlet port, and master cylinder pressure from the other circuit is applied to the secondary inlet port with the result that prior to closing of the valve seat there is a net rearward force exerted by fluid pressure on both the primary piston and the secondary piston. In the event of failure of the circuit connected to the secondary inlet port the loss of fluid pressure acting on the annular area will prevent the first piston from being urged rearwardly, thereby to disable the piston.

The invention will now be further described, by way of example only, with reference to the accompanying drawings in which.

Figure 1:
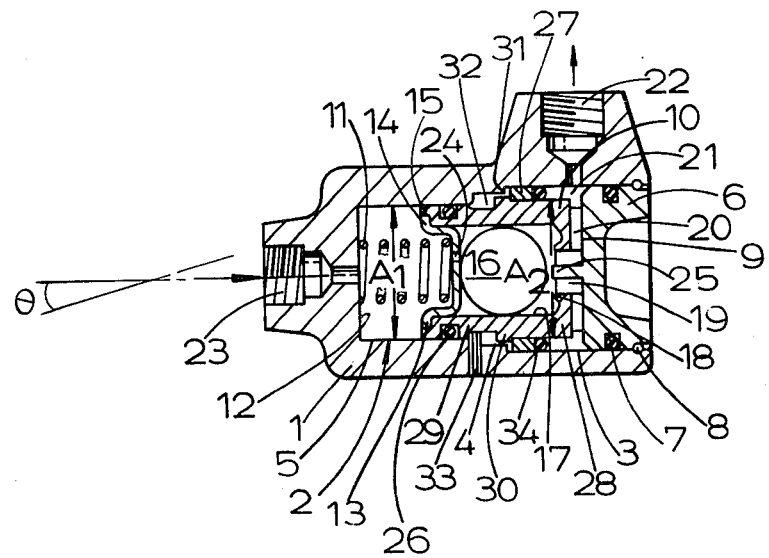
FIG. 1 is a longitudinal cross-sectional view of a valve assembly in accordance with the invention, with the parts being shown in the positions they occupy before the application of inlet pressure.

With reference to FIG. 1, the valve assembly comprises a housing 1 provided with a rearwardly extending multi-stepped bore 2 having bore portions 3, 4 and 5 of progressively reduced diameter. The housing will normally be mounted in a vehicle with the axis of bore 2 inclined at a small angle $\theta$ with respect to the horizontal, and with the right hand end of the housing pointing forwardly of the vehicle. The term 'front' and 'rear' are used in that sense throughout.

The front end of bore 2 is closed by a cup-shaped plug 6 sealed to the wall of bore portion 3 by an annular seal 7 located in an annular recess in the plug, and the plug is retained in position by a locking ring 8. The front face 9 of a cup-shaped primary piston 10 is held in engagement with plug 6 by a coiled compression spring 11 acting between the rear end wall 12 of bore 2 and a top-hat shaped, pressed metal ball retainer 13 of which the rim 14 is received within an annular open-ended recess 15 in the rear end of primary piston 10. A deceleration sensing element in the form of a ball 16 is held captive in the bore 17 of primary piston 10 and normally rests against ball retainer 13 due to the inclination $\theta$ of housing 1. The diameter of ball 16 is slightly less than that of bore 17 to permit rolling of the ball. An annular rearwardly facing valve seating 18 is provided on the front end wall of primary piston 10 and encircles the rear end of an axial bore 19 extending through the piston end wall. Front face 9 of primary piston 10 is formed with a diametrical recess 20 to provide permanent fluid communication between bore 19 and an outlet chamber 21 which communicates permanently with an outlet port 22.

An inlet port 23 extends axially through the rear end of housing 1 to communicate permanently with bore portion 5 and with the bore 17 of primary piston 10 by way of a hole 24 in ball retainer 13. Inlet port 23 is connected in use to the outlet of an hydrostatic master cylinder, or other suitable hydraulic fluid pressure source, and the outlet port 22 is connected to at least one rear wheel brake.

At zero or very low inlet pressure the parts are as shown in FIG. 1, and ball 16 is prevented from rolling into engagement with seating 18 by an axial projection 25 in bore 19 and integral with plug 6, the length of projection 25 being such that its free end is located just rearwardly of seat 18, as shown, when primary piston 10 is engaged with plug 6.

The rear end of the primary piston 10 is slidably sealed to the wall of bore portion 5 by an annular seal 26 located in an external annular recess of piston 10. A secondary piston 27 in the form of a ring of oblong-rectangular transverse cross-section has its radially inner surface slidably located on the radially outer surface of a front end portion 28 of primary piston 1, of which the external diameter is greater than that of the front end portion 29 of primary piston 10, and secondary piston 27, and the radially outer surface of piston 27 slidably engages the wall of bore portion 3.

The rearward movement of secondary piston 27 relative to primary piston 10 is limited by a stop in the form of a radially outwardly directed flange 30 provided on primary piston 10, the secondary piston 27 normally resting against flange 30 as shown, and the rearward movement of secondary piston 27 relative to housing 1 being limited by the shoulder 31 between housing bore portions 3 and 4. Shoulder 31 constitutes restraining means for the secondary piston 27. An annular chamber 32 defined between the rear end of secondary piston 27 and seal 26 is vented to atmosphere by a tubular pin 33. The pin 33 may also serve to retain piston 10 against rotation.

An O-ring 34 is seated against the front face of secondary piston 27 and sealingly engages the radially outer surface of piston portion 28 and the wall of bore portion 3, thereby to seal the rear end of annular outlet chamber 21.

The operation of the valve assembly of FIG. 1 will now be described in conjunction with the graph of FIG. 2, in which the theoretically ideal pressure curves for the driver-only condition and the laden condition of the vehicle are shown as curves A and B respectively. Considering firstly a brake application in the driver-only condition, the inlet port 23 is initially in direct communication with the outlet port 22 by way of bore portion 5, hole 24, bore 19, recess 20 and outlet chamber 21. As the inlet pressure rises, the portion C in FIG. 2, primary piston 10 is subject to inlet pressure acting forwardly over the area $A_1$ of its rear end, corresponding to the cross-sectional area of bore portion 5, and to inlet pressure acting in outlet chamber 21 over the larger area $A_2$, the cross-sectional area of the piston portion 28. Also, the annular area $A_3$ of the front end of secondary piston 27 is subject to the inlet pressure acting in chamber 21 through seal 34, the rear face of secondary piston 27, also of area $A_3$, being subject to atmospheric pressure in chamber 32, thereby to hold secondary piston 27 against flange 30.

Thus, the primary piston initially experiences a net rearward force corresponding to inlet pressure acting over an area $(A_2+A_3-A_1)$, which is opposed by the force of spring 11. The pistons 10 and 27 move progressively rearwards with increasing inlet pressure until secondary piston 27 engages shoulder 31. Shoulder 31 will thereafter bear the force resulting from pressure in chamber 21 acting over the area $A_3$ of secondary piston 27, so that the primary piston 10 will be relieved of this rearward force. Thus, unless the inlet pressure rises substantially above that pressure at which secondary piston 27 engages shoulder 31 there will be no further rearward movement of primary piston 10, and the strength of spring 11 is chosen such that in the driver-only braking condition further movement of piston 10 is not likely to occur. This is because the deceleration forces produced by braking will then be sufficient to cause the ball 16 to roll forwards sealingly to engage valve seat 18 and cut off fluid communication between port 23 and outlet chamber 21. This occurrence gives rise to the discontinuity D in the driver-only characteristic of FIG. 2.

As the pressure at inlet 23 is further increased from point D, an area $A_1$ of the primary piston will be subjected to the increasing inlet pressure, an area $A_2$ of the primary piston and an area $A_3$ of the secondary piston will be subjected to the outlet pressure acting in outlet chamber 21 at point D. Since the force corresponding to outlet pressure at point D acting over the area $A_3$ of secondary piston 27 is supported by shoulder 31, the inlet pressure has to rise by a substantial amount before the increased inlet pressure acting over area $A_1$ of the primary piston is sufficient at point F to overcome the outlet pressure force acting on secondary piston 27. Thus, in between points D and F, the portion E of the graph, the inlet pressure rises with no corresponding increase of outlet pressure.

The length of the projection 25 is arranged such that when the primary piston 10 is engaged with secondary piston 27, secondary piston 27 is engaged with shoulder 31, and ball 16 is engaged with seat 18, the projection 25 is just clear of ball 16. This is the situation at point F so that when primary piston 10, together with secondary piston 27, move forwards due to further increase in inlet pressure ball 16 is unseated by projection 25 and thereafter for further increase of inlet pressure the ball 16 co-operates with seat 18 and projection 25 to perform a metering of fluid through bore 19 to outlet chamber 21. During the metering action the pistons 10 and 27 move in unison, so that the rate of change of outlet pressure compared with that of inlet pressure is in the ratio ($A_2 + A_3$) to $A_1$. This gives the portion G of the driver-only characteristic of FIG. 2.

The operation of the valve of FIG. 1 in the laden condition of the vehicle will now be described. The portion C of the graph of FIG. 2 will be repeated, but the necessary deceleration of the vehicle to cause rolling of ball 16 to close seat 18 will not occur until greater braking forces have been reached at point J, the portion C of the graph during which valve seat 18 is open being extended over the portion H. At point J valve seat 18 is closed by ball 16, but during the major part of the portion H, the inlet pressure acting over the pressure effective area ($A_2 - A_1$) of primary piston 10, due to inlet pressure acting on its front and rear ends, is sufficient to move primary piston 10 rearwards away from the secondary piston 27 held against shoulder 31. Thus, when the valve seat 18 closes at point J further rise in inlet pressure will result in forward movement of primary piston 10 through the stationary secondary piston 27 to displace trapped fluid in outlet chamber 21 to outlet port 22, to give the portion K of the graph of FIG. 2. The ratio of the rate of increase in outlet pressure to that of inlet pressure during portion K corresponds simply to the ratio of areas $A_1$ to $A_2$ of the rear and front ends of the primary piston.

At point L the flange 30 on primary piston 10 re-engages with the secondary piston 27 which is still held against step 31 by pressure in outlet chamber 21. For further increases in inlet pressure portions M and N of the graph are produced in the same manner as portions E and G respectively in the driver-only condition, except that the portion M lasts for a greater rise of inlet pressure than portion E due to the correspondingly greater outlet pressure acting on the secondary piston 27 at point L as compared with at point P, the force of which needs to be overcome before the secondary piston is released from shoulder 31.

Figure 2:
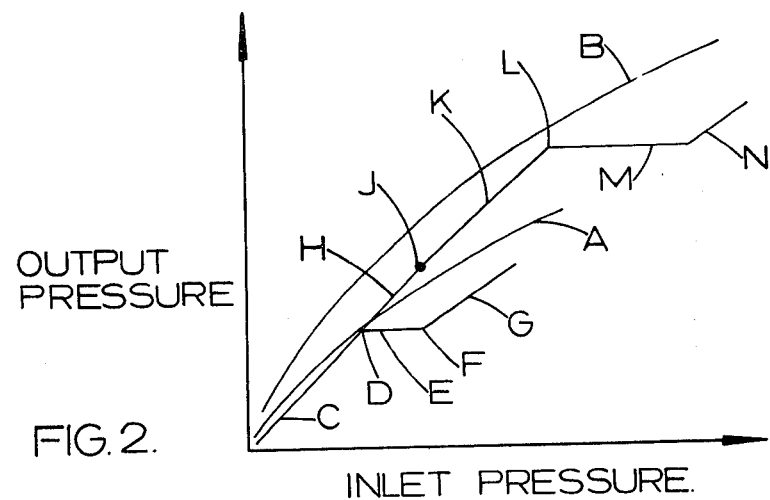
FIG. 2 is a graph of outlet pressure as ordinate against inlet pressure as abscissa for the assembly of FIG. 1.

It will be seen from FIG. 2 that the characteristics of the valve assembly of FIG. 1 approximate to the theoretical curves, and that the principal mechanism by which the assembly adapts to an increase in load of the vehicle is the increased displacement of the primary piston 10 relative to the arrested secondary piston 27 at higher inlet pressures which gives rise to the portion K of the graph.

The hole 24 in ball retainer 13 is positioned above the axis of the ball 16 so that on a rapid increase in inlet pressure on panic braking the jet of fluid emerging from the hole 24 will impinge on the upper part of ball 16 causing it quickly to roll against seat 18, so that point D, or point J according to the loading of the vehicle, is displaced towards lower inlet pressures.

During bleeding of the brakes the projection 25 prevents ball 16 from closing seat 18 when it is urged forwardly by flow forces.

Figure 3:
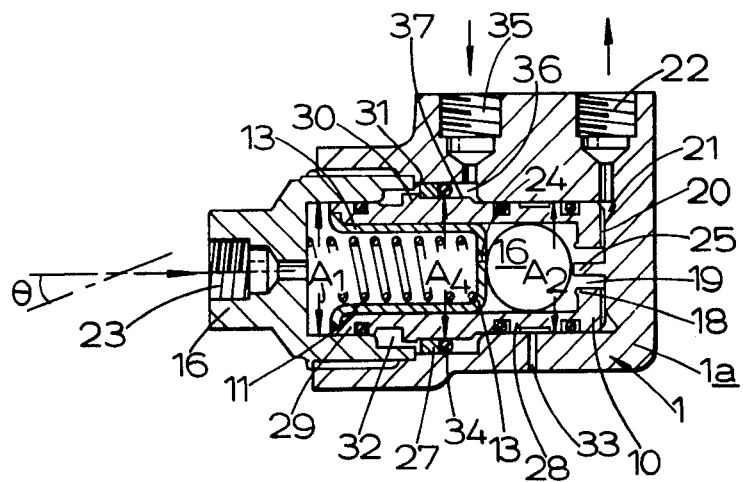
FIG. 3 is a view similar to FIG. 1 of a modified valve assembly having a secondary inlet port for connection to a second braking circuit.
Figure 4:
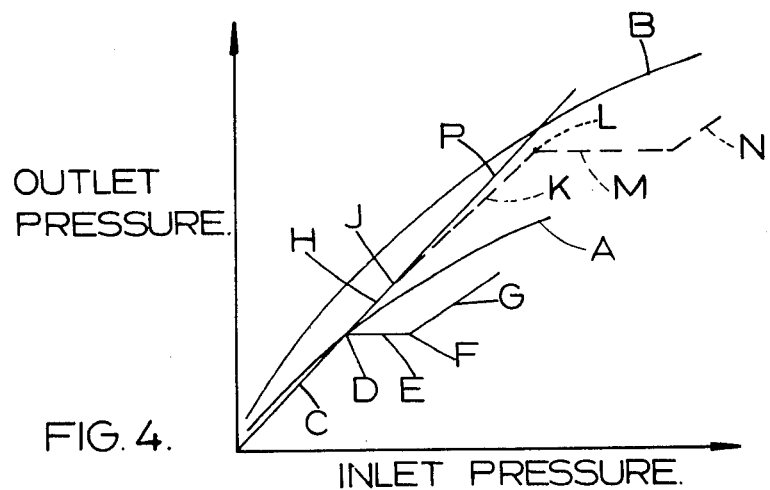
FIG. 4 is a graph of outlet pressure against primary inlet pressure for the assembly of FIG. 3.

The valve assembly of FIG. 3 is similar in most respects to that of FIG. 2 and corresponding reference numerals have been applied to corresponding parts. Also, in FIG. 4 which shows the characteristics of the FIG. 3 assembly letters corresponding to those of the corresponding parts of FIG. 2 have been used. The assembly is mounted in a vehicle with its right hand end in FIG. 3 pointing forwardly of the vehicle. In the assembly of FIG. 3 housing 1 is formed from two threadedly connected parts 1a and 1b. Part 1a is formed with a secondary inlet port 35 which is connected to the supply line between a master cylinder outlet and a front wheel braking circuit, whereas primary inlet port 23 is connected to an independent outlet of the master cylinder which supplies rear wheel brakes by way of outlet port 22. The arrangement of the assembly of FIG. 3 is such that providing both brake circuits are operational the control piston assembly 10, 27 operates in a similar manner to that of FIG. 1, but in the event of failure of the front wheel brake circuit connected to secondary inlet port 35 the control piston assembly 10, 27 is disabled.

In this construction the cross-sectional area $A_1$ of the rear end portion 29 of the primary piston is slightly greater than the corresponding area $A_2$ of the front end portion 28 which end portions are slidably sealed in housing parts 1b and 1a respectively. The pressure in outlet chamber 21 acts over the area $A_2$ of the primary piston 10, but in this case the secondary piston 27 is not subject to outlet pressure. Instead, secondary piston 27 is subject to secondary inlet pressure acting over its front face of area $A_3$ in annular chamber 36. Secondary piston 27 is slidably mounted on an enlarged diameter, intermediate portion 37 of primary piston 10 of cross-sectional area $A_4$ which is greater than both areas $A_1$, $A_2$. As with the FIG. 1 construction chamber 32 is vented to atmosphere.

Since $A_1$ is greater than $A_2$ it will be seen that in the event of failure of the front wheel brake circuit connected to secondary inlet port 35 the primary piston 10 will not move rearwardly from the retracted position shown, since the net pressure effective area $(A_1-A_2)$ of primary piston 10 subject to inlet pressure faces rearwardly. In this condition the primary inlet port 23 is directly connected to the outlet port 22, and ball 16 is prevented from engaging with seat 18 by projection 25, so that outlet pressure follows the primary inlet pressure as shown by straight line P of FIG. 4.

When the front circuit connected to secondary inlet port 35 is operational the pressure in secondary inlet 35 will substantially equal that in primary inlet 23 when the master cylinder is of the kind which generates substantially equal pressures at its two outlets. Thus, during the portion C of the characteristic the secondary piston is subject to secondary inlet pressure in chamber 36 acting over its area $A_3$, and the primary piston has a net pressure effective area of $(A_4-A_1)$ subject to inlet pressure, which faces forwardly. During the portion H of the characteristic, that is in the laden condition of the vehicle, primary piston 10 moves rearwardly through the arrested secondary piston 27 due to inlet pressure again acting over the pressure effective area of $(A_4-A_1)$ which faces forwardly. Thus, by arranging that the pressure effective area of $(A_4-A_1)$ of the FIG. 3 construction is substantially equal to the corresponding pressure effective area $(A_2-A_1)$ of the FIG. 1 construction, the portions C, E, H, K and M will be duplicated by the FIG. 3 assembly when both brake circuits are operational in the manner described with reference to FIGS. 1 and 2. However, during metering which produces portions G and N of the characteristics, it will be appreciated that the secondary piston 27 is still subject on its front face to inlet pressure in chamber 36, rather than to outlet pressure as with the FIG. 1 construction. Thus, during metering, when the pistons 10 and 27 move in unison as an assembly relative to housing 1, the pressure effective area of the control piston assembly 10, 27 subject to outlet pressure is $A_2$, and the pressure effective area of the assembly 10, 27 subject to inlet pressure is $A_1-(A_4-A_2)-A_3$, so that the slope of portions G and N is $[A_1+A_2-(A_3+A_4)]/A_2$.

Figure 5:
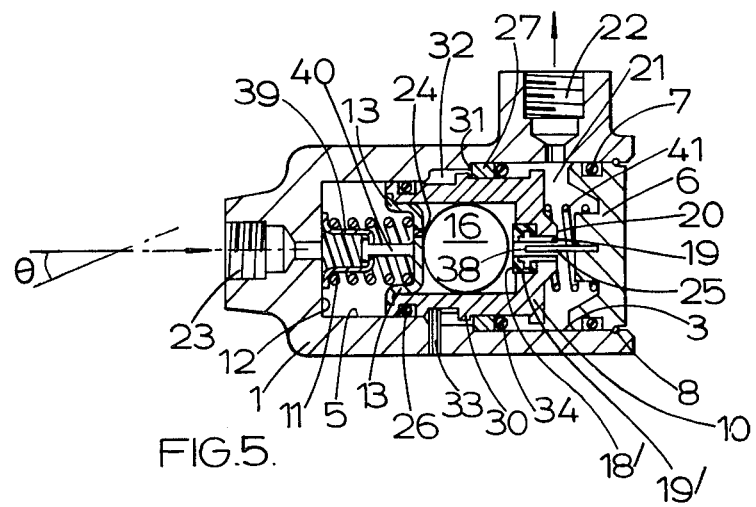
FIG. 5 is a view similar to FIG. 1 but of a further modified assembly.
Figure 6:
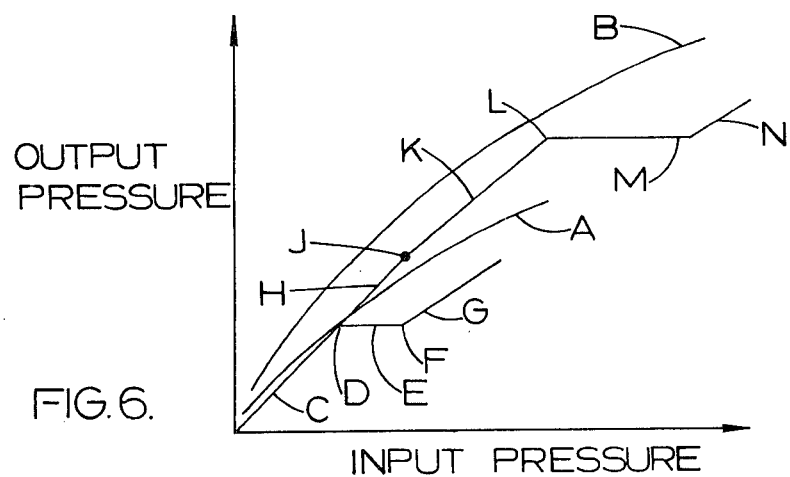
FIG. 6 is a graph of outlet pressure against inlet pressure for the assembly of FIG. 5.

The assembly of FIG. 5 has only a single inlet port 23. Parts corresponding to those of FIG. 1 have been given corresponding reference numerals. Again, the assembly is mounted in a vehicle with its right hand end pointing forwardly of the vehicle. The main differences are that an elastomeric valve seat member 18' is employed instead of the metal seat 18 of FIG. 1, and that the portions G and N of the pressure characteristics are not produced by a metering action. FIG. 6 shows the pressure characteristics of the FIG. 5 assembly, and corresponding letters have been applied to portions corresponding to those of FIG. 2.

Valve seat member 18' is located substantially within a rearwardly facing counterbore 19' to bore 19 and is provided with a valve opening 38 of smaller diameter than the diameter of the valve seat 18 of FIG. 1. The use of an elastomeric valve seat member 18' with a small diameter valve opening 38 provides improved valve sealing over the FIG. 1 construction.

The projection 25 is not required to perform a metering function but merely to unseat ball 16 if it should become engaged with seat member 18' during bleeding.

In order to permit substantial forward movement of the primary piston 10 from its normal unpressurised position shown in the drawings, the piston 10 is spaced from plug 6, as compared with FIG. 1. This spacing is arranged by caging spring 11 between ball retainer 13 and a top-hat shaped retainer 39 connected to ball retainer 13 by a lost-motion connection comprising a headed rod 40 rigidly secured to retainer 13. A light compression spring 41 acts between plug 6 and the front end of primary piston 10 to hold the primary piston 10 in the normal position shown in which spring retainer 39 abuts the end wall 12 of bore portion 5 and a small tolerance clearance is provided between flange 30 and secondary piston 27 engaged with shoulder 31.

The assembly of FIG. 5 works in an identical manner to that of FIG. 1 in generating the portions C, D, E, H, J, K, L and M of the characteristics. However, at point F in the driver-only condition of the vehicle, and at the discontinuity between portions M and N in the laden condition, when the rightward force on primary piston 10 is just sufficient to move secondary piston 27 away from shoulder 31, a metering action does not then ensue. Instead, pistons 10 and 27 move forwards as an assembly, with valve opening 38 closed by ball 16 so that the fluid in outlet chamber 21 is progressivley expelled through outlet port 22. Thus the ratio of outlet pressure increase to inlet pressure increse during the portions G and N of the characteristics is $A_1/(A_2+A_3)$. The length of projection 25 is chosen such that during braking the piston 10 will not move sufficiently forwards for the ball 16 to be engaged by projection 25.

I claim:

1. A deceleration-sensing modulator valve assembly for vehicle braking systems comprising a housing provided with a brake pressure inlet and outlet, a control piston assembly working in said housing for controlling the relationship between the inlet and outlet pressures, and a deceleration sensing element located in said housing for closing a valve seat on deceleration of the housing above a deceleration threshold, said control piston assembly comprising a primary piston and an annular secondary piston slidably mounted on said primary piston, resilient means biasing said primary piston in a forward direction, a stop carried by said primary piston for limiting rearward movement of said secondary piston relative to said primary piston, a fixed abutment on said housing directly engageable by said secondary piston for restricting rearward movement of said secondary piston relative to said housing, said primary piston being provided with a bore, said deceleration sensing element being located substantially in said bore, said valve seat being associated with said primary piston for controlling fluid communication between said inlet and outlet, and the arrangement is such that prior to closure of said valve seat by said sensing element the net pressure effective area of said primary piston subject to inlet pressure is forwardly facing whereby inlet pressure urges said primary piston rearwardly against the biasing of said resilient means, and after closure of said valve seat the net pressure effective area of said primary piston subject to inlet pressure is rearwardly facing, a forwardly facing area of said primary piston then being exposed to outlet pressure, and said secondary piston is subject at all times on its front face to outlet pressure.

2. A valve assembly as claimed in claim 1 wherein said primary piston has larger and smaller diameter front and rear ends respectively which are exposed respectively to outlet and inlet pressure chambers communicating directly with said outlet and inlet respectively.

3. A valve assembly as defined in claim 1 wherein said resilient means comprises a caged spring, and a further resilient means of smaller fitted load than said caged spring is arranged to bias said primary piston in the rearward direction.

4. A deceleration-sensing modulator valve assembly for a dual circuit vehicle braking system comprising a housing provided with first and second inlets for connection respectively to first and second ports of a tandem master cylinder, and an outlet for connection to a rear wheel brake, a control piston assembly working in said housing for controlling the relationship between the inlet and outlet pressures, and a deceleration sensing element located in said housing for closing a valve seat on deceleration of the housing above a deceleration threshold, said control piston assembly comprising a primary piston and an annular secondary piston slidably mounted on said primary piston, resilient means biassing said primary piston in a forward direction, a stop carried by said primary piston for limiting rearward movement of said secondary piston relative to said primary piston, restraining means for restricting rearward movement of said secondary piston relative to said housing, said primary piston being provided with a bore, said deceleration sensing element being located substantially in said bore, said valve seat being associated with said primary piston for controlling fluid communication between said first inlet and said outlet, and the arrangement is such that prior to closure of said valve seat by said sensing element the net pressure effective area of said primary piston subject to the inlet pressure of said first and second inlets is forwardly facing whereby inlet pressure urges said primary piston rearwardly against the biassing of said resilient means, and after closure of said valve seat the net pressure effective area of said primary piston subject to inlet pressure is rearwardly facing, a forwardly facing area of said primary piston then being exposed to outlet pressure, and said secondary piston is subject at all times on its front face to the inlet pressure at said second inlet.

5. A valve assembly as claimed in claim 4 wherein said restraining means comprises an abutment on said housing which is engaged by said secondary piston.

6. A valve assembly as claimed in claim 4 wherein the rear end of said primary piston exposed to primary inlet pressure is made of equal or larger diameter than the front end exposed to outlet pressure, and an annular forwardly facing area of said primary piston is exposed to the pressure of said secondary inlet, the pressure effective area of the annular area being arranged to be greater than the difference in area between the ends of said primary piston.

* * * * *